(12) United States Patent
Nishikawa

(10) Patent No.: US 8,891,644 B2
(45) Date of Patent: Nov. 18, 2014

(54) COMMUNICATION APPARATUS AND COMMUNICATION METHOD

(71) Applicant: Icom Incorporated, Osaka (JP)

(72) Inventor: Nobuyoshi Nishikawa, Osaka (JP)

(73) Assignee: Icom Incorporated (JP)

( * ) Notice: Subject to any disclaimer, the term of this patent is extended or adjusted under 35 U.S.C. 154(b) by 184 days.

(21) Appl. No.: 13/689,370

(22) Filed: Nov. 29, 2012

(65) Prior Publication Data

US 2013/0215994 A1    Aug. 22, 2013

(30) Foreign Application Priority Data

Feb. 20, 2012 (JP) .................................. 2012-034277

(51) Int. Cl.
| | |
|---|---|
| H04L 27/28 | (2006.01) |
| H04L 25/03 | (2006.01) |
| H04L 27/22 | (2006.01) |
| H04L 27/06 | (2006.01) |
| H04L 27/04 | (2006.01) |
| H04L 27/26 | (2006.01) |

(52) U.S. Cl.
CPC ................ *H04L 27/06* (2013.01); *H04L 27/04* (2013.01); *H04L 27/2614* (2013.01)
USPC ............................ 375/260; 375/296; 375/316

(58) Field of Classification Search
USPC .......... 375/260, 295, 296, 316; 370/203, 208, 370/210
See application file for complete search history.

(56) References Cited

U.S. PATENT DOCUMENTS

2011/0255870 A1* 10/2011 Grigoryan et al. .............. 398/65

FOREIGN PATENT DOCUMENTS

JP    2006-165781    6/2006

OTHER PUBLICATIONS

Ryu et al., "A New PAPR Reduction Scheme: SPW (Subblock Phase Weighting," IEEE, 2002, pp. 81-88.*
Varahram et al., "A Low Complexity Partial Transmit Sequence Scheme by Use of Dummy signals for PAPR Reduction in OFDM System," IEEE, 2010. pp. 2416-2420.*

* cited by examiner

*Primary Examiner* — Tesfaldet Bocure
(74) *Attorney, Agent, or Firm* — Baker & McKenzie LLP

(57) ABSTRACT

A serial-parallel converter generates a subcarrier modulation signal from a modulation signal which is generated from the input signal by a modulator. An IFFT unit performs an inverse fast Fourier transformation on the subcarrier modulation signal. A divider divides a calculation result to generate first subdata. A disperser adds dispersion coefficients to elements of first subdata. A sorter generates second subdata from post-dispersion first subdata. An operator performs a predetermined calculation using elements in the same line of the post-dispersion first subdata and second subdata. A corrector subtracts correction coefficients from elements of post-average first subdata. A synthesizer arranges post-correction first subdata in positions at the time of division and synthesizes them to generate a baseband signal. A transmitter generates a transmission signal to transmit.

13 Claims, 8 Drawing Sheets

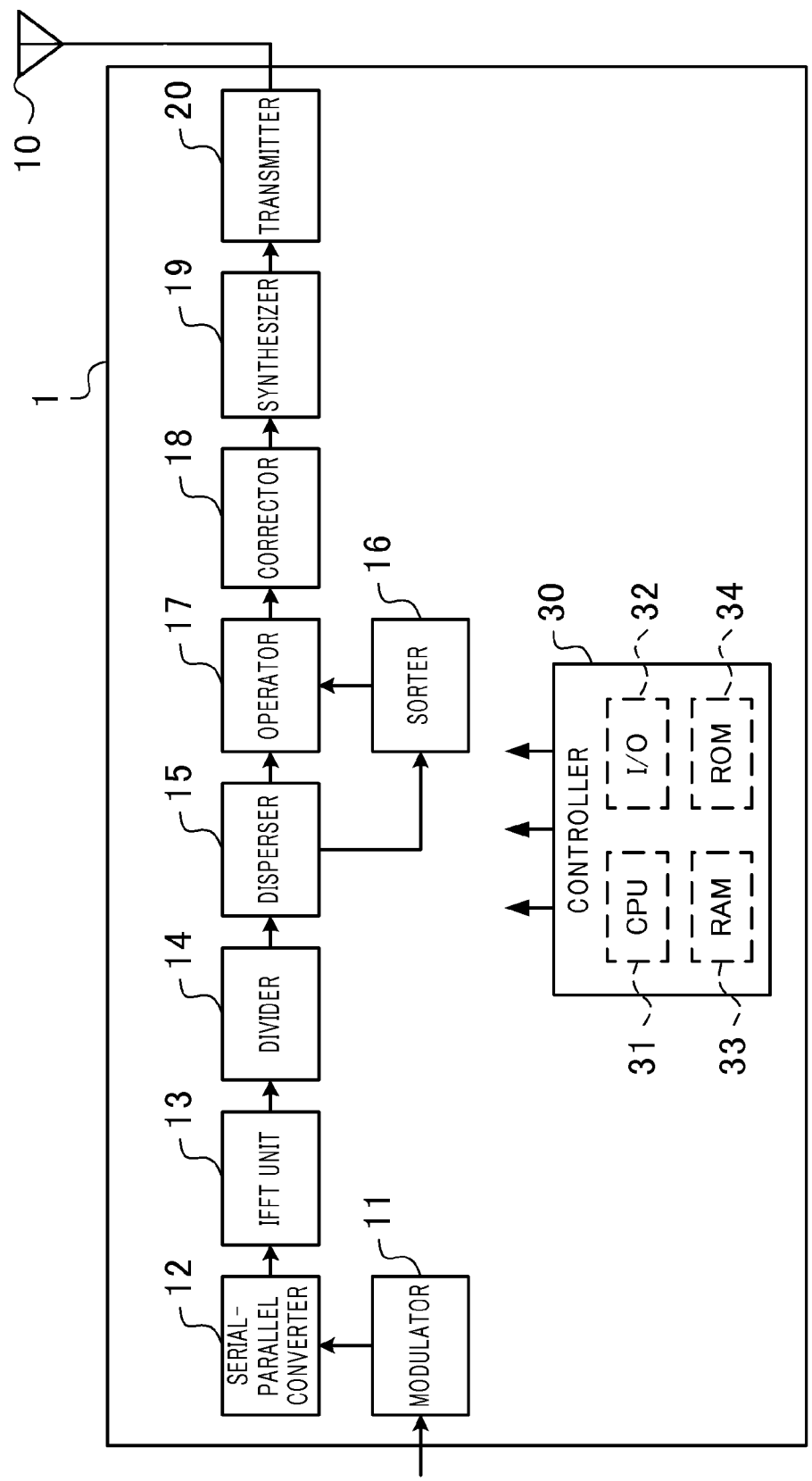

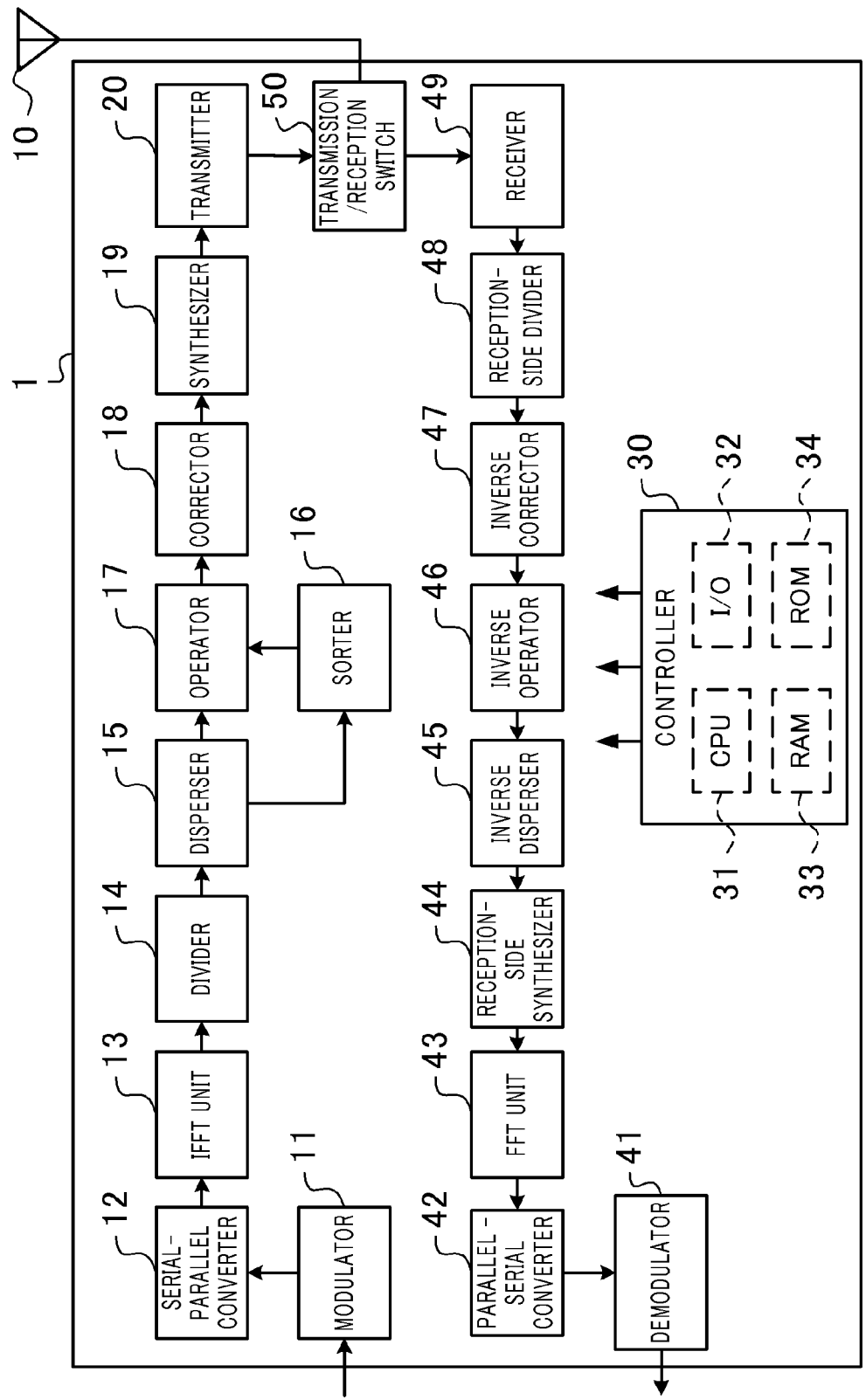

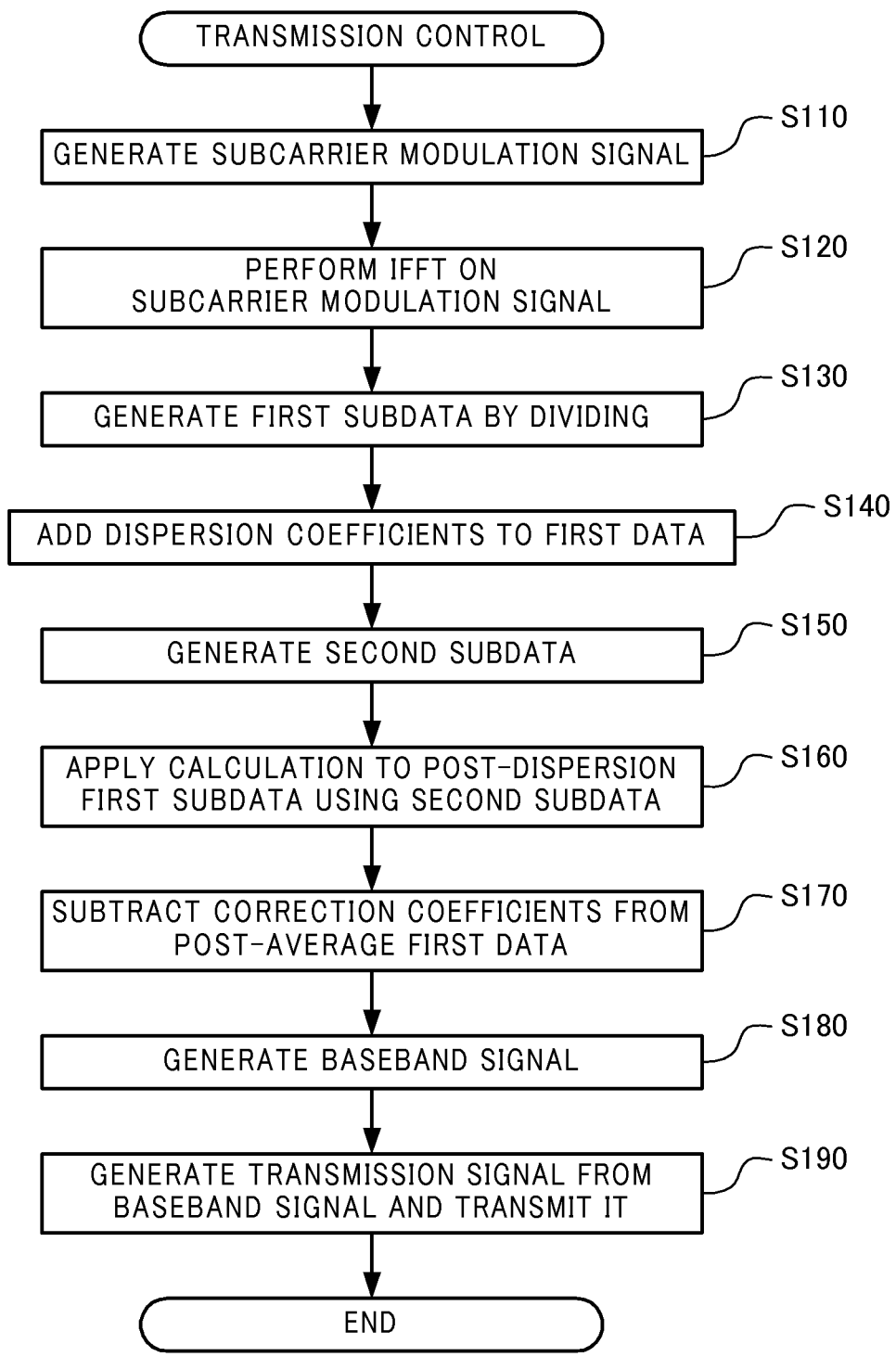

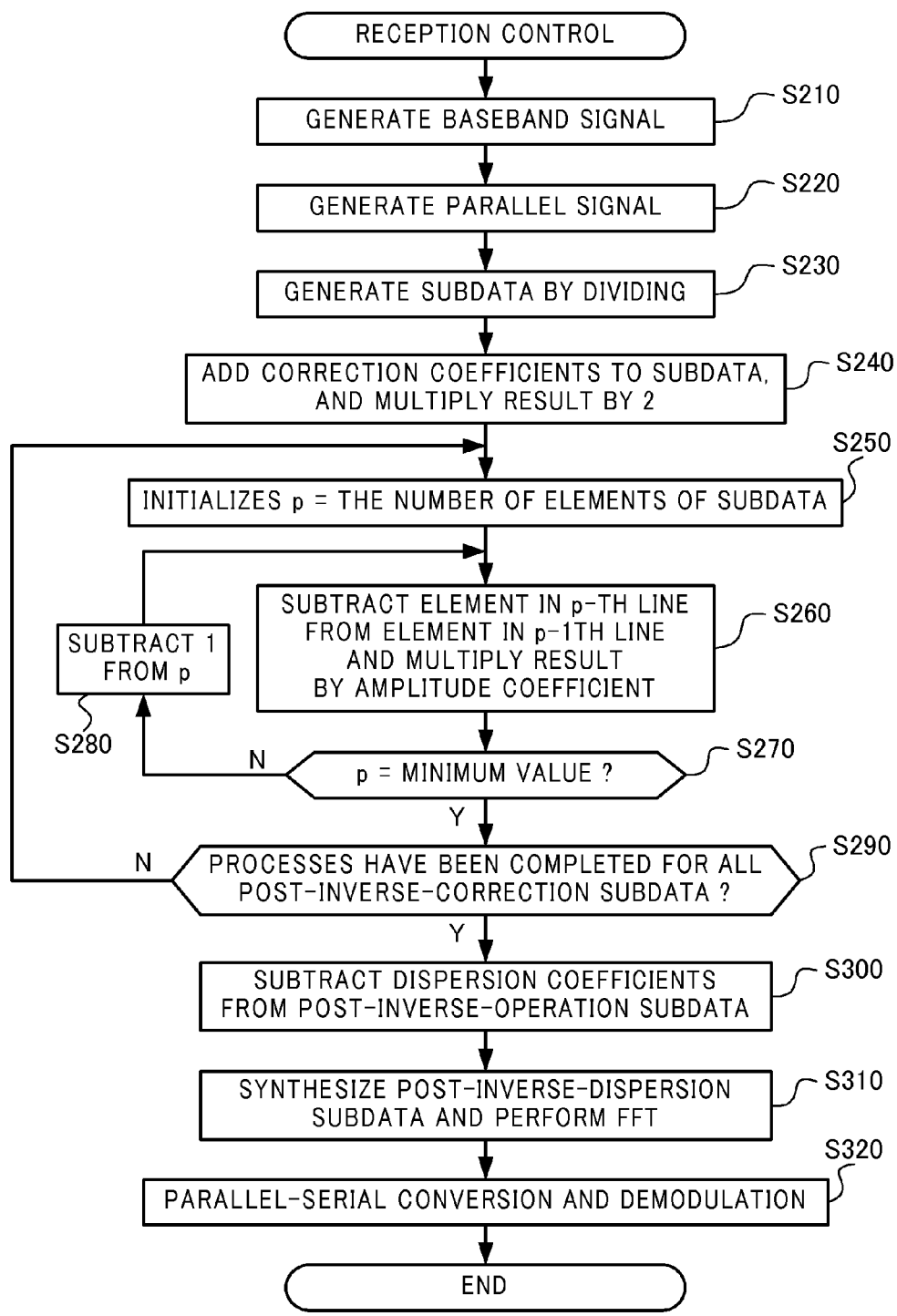

COMMUNICATION APPARATUS AND COMMUNICATION METHOD

CROSS-REFERENCE TO RELATED APPLICATION

This application claims the benefit of Japanese Patent Application No. 2012-034277, filed on Feb. 20, 2012, the entire disclosure of which is incorporated by reference herein.

FIELD

This application relates to a communication apparatus and a communication method.

BACKGROUND

In OFDM (Orthogonal Frequency-Division Multiplexing) communication, an input signal is modulated with subcarriers, and the modulated input signal is subjected to an IFFT (Inverse Fast Fourier Transformation) to generate a baseband signal. When the number of subcarriers increases to increase the FFT (Fast Fourier Transformation) size, therefore, a baseband signal with a high peak is generated, increasing the PAPR (Peak-to-Average Power Ratio). The increase in the PAPR needs an amplifier having a wide range of linearity to transfer a signal without distortion. To meet the requirement, techniques of reducing the PAPR are developed.

Unexamined Japanese Patent Application KOKAI Publication No. 2006-165781 discloses a technique of controlling the phase of a subcarrier modulation signal based on the optimal phase, calculated by a sequential decision procedure, prior to an IFFT in order to reduce the PAPR.

The OFDM communication needs to cope with reducing the PAPR. The technique disclosed in Unexamined Japanese Patent Application KOKAI Publication No. 2006-165781 needs to control the phase, subcarrier by subcarrier, by repeatedly calculating the optimal phase to reduce the PAPR. In addition, the technique disclosed in Unexamined Japanese Patent Application KOKAI Publication No. 2006-165781 cannot control the degree of reduction in PAPR.

SUMMARY

Accordingly, it is an object of the present invention to reduce the PAPR in OFDM communication, and control the degree of reduction in PAPR.

To achieve the object, according to a first aspect of the invention, there is provided a communication apparatus for communicating with another apparatus in orthogonal frequency-division multiplexing wireless communication, the communication apparatus comprising:

a modulator that modulates an input signal using a predetermined modulation scheme, and assigns the modulated input signal to subcarriers with frequency components orthogonal to each other, thereby generating a subcarrier modulation signal;

a first transformer that performs an inverse fast Fourier transformation on the subcarrier modulation signal;

a divider that divides a calculation result by the first transformer into a predetermined number of pieces to generate a plurality pieces of first subdata;

a disperser that adds dispersion coefficients, which are complex numbers defined for each first subdata and of which at least one is a complex number other than 0, to values of respective elements of the plurality pieces of first subdata to generate post-dispersion first subdata;

a sorter that generates second subdata in which each element of the post-dispersion first subdata is arranged in a position different from a position of the each element in the post-dispersion first subdata, and a value of at least one predetermined element is replaced with 0, and in which combinations of elements in same positions in the post-dispersion first subdata and in the second subdata are different from each other;

an operator that divides a value of sum by 2, the value of sum being a sum of a value of an element which is not the predetermined element of which the value is replaced with 0 by the sorter among elements of the second subdata, and a value which is obtained by dividing a value of an element located in a same position in the post-dispersion first subdata as the position of the element which is not the predetermined element by a predetermined amplitude coefficient, and divides a value of an element by 2 in a same position in the post-dispersion first subdata as the position of the predetermined element among the elements of the second subdata, thereby generating post-average first subdata;

a corrector that subtracts correction coefficients which are complex numbers defined for each first subdata from values of respective elements of the post-average first subdata to generate post-correction first data;

a synthesizer that generates a baseband signal based on synthesized data in which the post-correction first subdata is arranged in positions of the plurality pieces of first subdata when the divider divides the calculation result; and a transmitter that generates a transmission signal from the baseband signal and transmits the transmission signal.

It is preferable that the divider may equally divide the calculation result by the first transformer with a divisor of a fast Fourier transformation size.

It is preferable that the divider may equally divide the calculation result by the first transformer into four pieces, the disperser may use complex numbers different from each other, which represent directions from an origin of a complex plane on the complex plane and in each of which an absolute value of a real part and an absolute value of an imaginary part are same, as the dispersion coefficients, and the corrector may use values which are obtained by multiplying a predetermined real number to the dispersion coefficients as the correction coefficients.

It is preferable that the sorter may generate the second subdata by replacing at least one value of an element with 0, among data in which elements of the post-dispersion first subdata are shifted a predetermined number of times in a predetermined direction.

It is preferable that the sorter may generate the second subdata by replacing a value of an element of a last line with 0, among data in which elements of the post-dispersion first subdata are shifted one time upward.

It is preferable that the sorter may generate the second subdata by replacing values of elements of even lines with 0, among data in which elements of the post-dispersion first subdata are shifted one time upward.

According to a second aspect of the invention, there is provided a communication apparatus for communicating with another apparatus in orthogonal frequency-division multiplexing wireless communication, the communication apparatus comprising:

a receiver that receives a transmission signal and generates a baseband signal;

a serial-parallel converter that performs serial-parallel conversion on the baseband signal to generate a parallel signal;

a reception-side divider that divides the parallel signal into a predetermined number of pieces to generate a plurality pieces of subdata;

an inverse corrector that adds correction coefficients which are complex numbers defined for each subdata to values of respective elements of the plurality pieces of subdata, and multiplies the result by 2 to generate post-inverse-correction subdata;

an inverse operator that subtracts from a value of a predetermined element of the post-inverse-correction subdata a value of an element associated with the predetermined element and multiplies the result by a predetermined amplitude coefficient, and after that, repeats a calculation a predetermined number of times, in which a value of an element applied the calculation is subtracted from a value of an element associated with the element applied the calculation and the result is multiplied by the amplitude coefficient, thereby generating post-inverse-operation subdata;

an inverse disperser that subtracts dispersion coefficients, which are complex numbers defined for each subdata and of which at least one is a complex number other than 0, from values of respective elements of the post-inverse-operation subdata to generate post-inverse-dispersion subdata;

a reception-side synthesizer that synthesizes data in which the post-inverse-dispersion subdata is arranged in positions of the plurality pieces of subdata when the reception-side divider divides the parallel signal;

a second transformer that performs a fast Fourier transformation on the calculation result by the reception-side synthesizer to generate a subcarrier modulation signal; and a demodulator that demodulates the subcarrier modulation signal by a predetermined demodulation scheme.

It is preferable that the reception-side divider may equally divide the parallel signal with a divisor of a number of elements of the parallel signal.

It is preferable that the reception-side divider may equally divide the parallel signal into four pieces, the inverse disperser may use complex numbers different from each other, which represent directions from an origin of a complex plane on the complex plane and in each of which an absolute value of a real part and an absolute value of an imaginary part are same, as the dispersion coefficients, and the inverse corrector may use values which are obtained by multiplying a predetermined real number to the dispersion coefficients as the correction coefficients.

It is preferable that the inverse operator may subtract from a value of a predetermined element of the post-inverse-correction subdata a value of an element associated with the predetermined element, the element associated with the predetermined element being an element located in a last line of the post-inverse-correction subdata, or an element located right after the predetermined element and applied the calculation by the inverse operator, and multiplying the result by the amplitude coefficient.

It is preferable that the inverse operator may subtract from a value of an element of each odd line of the post-inverse-correction subdata a value of an element of an even line located right after the element of the each odd line, and multiplies the result by the amplitude coefficients.

According to a third aspect of the invention, there is provided a communication method that is executed by a communication apparatus communicating with another apparatus in orthogonal frequency-division multiplexing wireless communication, the communication method comprising:

a modulation step of modulating an input signal using a predetermined modulation scheme, and assigning the modulated input signal to subcarriers with frequency components orthogonal to each other, thereby generating a subcarrier modulation signal;

a first transformation step of performing an inverse fast Fourier transformation on the subcarrier modulation signal;

a dividing step of dividing a calculation result by the first transformation step into a predetermined number of pieces to generate a plurality pieces of first subdata;

a dispersion step of adding dispersion coefficients, which are complex numbers defined for each first subdata and of which at least one is a complex number other than 0, to values of respective elements of the plurality pieces of first subdata to generate post-dispersion first subdata;

a sort step of generating second subdata in which each element of the post-dispersion first subdata is arranged in a position different from a position of the each element in the post-dispersion first subdata, and a value of at least one predetermined element is replaced with 0, and in which combinations of elements in same positions in the post-dispersion first subdata and in the second subdata are different from each other;

an operation step of dividing a value of sum by 2, the value of sum being a sum of a value of an element which is not the predetermined element of which the value is replaced with 0 by the sort step among elements of the second subdata, and a value which is obtained by dividing a value of an element located in a same position in the post-dispersion first subdata as the position of the element which is not the predetermined element by a predetermined amplitude coefficient, and divides a value of an element by 2 in a same position in the post-dispersion first subdata as the position of the predetermined element among the elements of the second subdata, thereby generating post-average first subdata;

a correction step of subtracting correction coefficients which are complex numbers defined for each first subdata from values of respective elements of the post-average first subdata to generate post-correction first data;

a synthesis step of generating a baseband signal based on synthesized data in which the post-correction first subdata is arranged in positions of the plurality pieces of first subdata when dividing the calculation result in the dividing step; and a transmission step of generating a transmission signal from the baseband signal and transmits the transmission signal.

According to a fourth aspect of the invention, there is provided a communication method that is executed by a communication apparatus communicating with another apparatus in orthogonal frequency-division multiplexing wireless communication, the communication method comprising:

a receiving step of receiving a transmission signal and generating a baseband signal;

a serial-parallel conversion step of performing serial-parallel conversion on the baseband signal to generate a parallel signal;

a reception-side dividing step of dividing the parallel signal into a predetermined number of pieces to generate a plurality pieces of subdata;

an inverse correction step of adding correction coefficients which are complex numbers defined for each subdata to values of respective elements of the plurality pieces of subdata, and multiplying the result by 2 to generate post-inverse-correction subdata;

an inverse operation step of subtracting from a value of a predetermined element of the post-inverse-correction subdata a value of an element associated with the predetermined element and multiplying the result by a predetermined amplitude coefficient, and after that, repeating a calculation a predetermined number of times, in which a value of an element applied the calculation is subtracted from a value of an element associated with the element applied the calculation and the result is multiplied by the amplitude coefficient, thereby generating post-inverse-operation subdata;

an inverse dispersion step of subtracting dispersion coefficients, which are complex numbers defined for each subdata and of which at least one is a complex number other than 0, from values of respective elements of the post-inverse-operation subdata to generate post-inverse-dispersion subdata;

a reception-side synthesis step of synthesizing data in which the post-inverse-dispersion subdata is arranged in positions of the plurality pieces of subdata when the parallel signal is divided in the reception-side dividing step;

a second transformation step of performing a fast Fourier transformation on the calculation result in the reception-side synthesis step to generate a subcarrier modulation signal; and a demodulation step of demodulating the subcarrier modulation signal by a predetermined demodulation scheme.

According to the invention, it is possible to reduce the PAPR in OFDM communication, and further control the degree of reduction in PAPR.

BRIEF DESCRIPTION OF THE DRAWINGS

A more complete understanding of this application can be obtained when the following detailed description is considered in conjunction with the following drawings, in which:

FIG. 1 is a block diagram illustrating a configuration example of a communication apparatus according to a first embodiment of the invention;

FIG. 2 is a block diagram illustrating a different configuration example of the communication apparatus according to the first embodiment;

FIG. 4 is a flowchart illustrating one example of operation of a transmission control performed by the communication apparatus according to the first embodiment;

FIG. 5 is a flowchart illustrating one example of operation of a reception control performed by the communication apparatus according to the first embodiment;

DETAILED DESCRIPTION

Figure 3A:
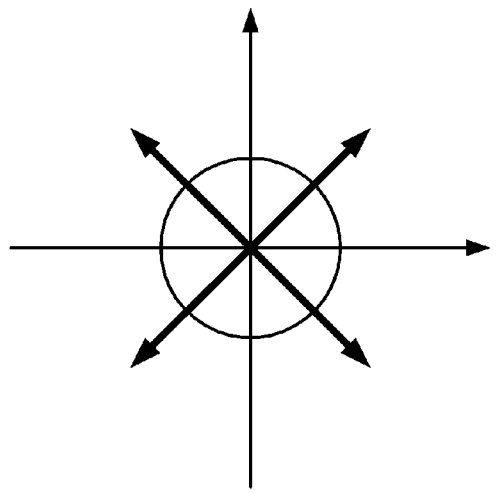
FIGS. 3A to 3C are drawings illustrating calculation processes performed by the communication apparatus according to the first embodiment of the invention.

An exemplary embodiment of the invention will be described in detail hereinbelow with reference to the accompanying drawings Like or same reference numerals are given to those components which are the same as, or correspond to, the components shown in the diagrams. An IFFT (Inverse Fast Fourier Transformation) is a concept including both IFFT and IDFT (Inverse Discrete Fourier Transformation) hereinafter. Therefore, the embodiment may be configured to perform an IDFT instead of an IFFT Likewise, an FFT (Fast Fourier Transformation) is a concept including both FFT and DFT (Discrete Fourier Transformation) hereinafter. When an IDFT and a DFT are carried out, an FFT size means the size of a DFT hereinafter.

First Embodiment

FIG. 1 is a block diagram illustrating a configuration example of a communication apparatus according to a first embodiment of the invention. The communication apparatus 1 communicates with another apparatus in OFDM (Orthogonal Frequency-Division Multiplexing) wireless communication. The communication apparatus 1 includes an antenna 10, a modulator 11, a serial-parallel converter 12, an IFFT unit 13, a divider 14, a disperser 15, a sorter 16, an operator 17, a corrector 18, a synthesizer 19, a transmitter 20, and a controller 30.

The controller 30 includes a CPU (Central Processing Unit) 31, a RAM (Random Access Memory) 33, and a ROM (Read-Only Memory) 34. Although signal lines from the controller 30 to the individual components are omitted to avoid complication and for the ease of understanding, the controller 30 is connected to the individual components of the communication apparatus 1 via an I/O (Input/Output) unit 32 to start and terminate the processes of the components and control the contents of the processes.

The RAM 33 stores data for generating a transmission frame, for example. The ROM 34 stores a control program for the controller 30 to control the operation of the communication apparatus 1. The controller 30 controls the communication apparatus 1 based on the control program.

FIG. 2 is a block diagram illustrating a different configuration example of the communication apparatus according to the first embodiment. To provide the communication apparatus 1 with a reception function, the communication apparatus 1 shown in FIG. 2 further includes a demodulator 41, a parallel-serial converter 42, an FFT unit 43, a reception-side synthesizer 44, an inverse disperser 45, an inverse operator 46, an inverse corrector 47, a reception-side divider 48, a receiver 49, and a transmission and reception switch 50. Referring to the communication apparatus 1 shown in FIG. 2 which has the transmission function and the reception function, a communication method which is carried out by the communication apparatus 1 will be described hereinbelow.

The modulator 11 modulates an input signal by a predetermined modulation scheme, to generate a modulation signal. The modulator 11 sends the generated modulation signal to the serial-parallel converter 12. The modulator 11 uses, for example, QPSK (Quadrature Phase-Shift Keying) as the modulation scheme. The serial-parallel converter 12 performs serial-parallel conversion on the modulation signal to generate a parallel signal, and assigns the generated parallel signal to subcarriers with frequency components orthogonal to each other to generate a subcarrier modulation signal. The serial-parallel converter 12 sends the generated subcarrier modulation signals to the IFFT unit 13. The IFFT unit 13 performs an IFFT on the subcarrier modulation signal, and sends the calculation result to the divider 14. When the subcarrier modulation signal is expressed by d, the calculation result u by the IFFT unit 13 is represented by following equation (1).

[Eq. 1]

$$u = F^{-1} \cdot d \tag{1}$$

The divider 14 generates a plurality pieces of first subdata by dividing the calculation result u by the IFFT unit 13 into a predetermined number of pieces. The predetermined number may not be limited to a number by which the calculation result u can be divided equally, and the number of elements in the first subdata may be different from each other. In cases where the predetermined number is the number by which the calculation result u can be divided equally, that is, the divisor of the FFT size, the number of the elements included in each first subdata is the same, thus it is easy to implement the process subsequent to the divider 14. In cases where the number of the elements in each first subdata is the same, the calculation result u is divided into four pieces of first subdata as following equation (2) when the predetermined number is 4 and the FFT size is N, for example. Each first subdata is represented as following equation (3). The divider 14 sends each first subdata to the disperser 15.

[Eq. 2]
$$u = \begin{bmatrix} u_0 \\ u_1 \\ \vdots \\ u_{N-1} \end{bmatrix} = \begin{bmatrix} u_1 \\ u_2 \\ u_3 \\ u_4 \end{bmatrix} \quad (2)$$

[Eq. 3]
$$u_k = \begin{bmatrix} u_{\frac{N}{4}(k-1)} \\ u_{\frac{N}{4}(k-1)+1} \\ \vdots \\ u_{\frac{N}{4}k-1} \end{bmatrix} \quad (k = 1, 2, 3, 4) \quad (3)$$

The disperser 15 adds dispersion coefficients to values of respective elements of the first subdata to generate post-dispersion first subdata, the dispersion coefficients being the complex numbers defined for each first subdata, and at least one of the dispersion coefficients is a complex number other than 0. For each first subdata, any of the complex numbers is defined beforehand which are isotropically-distributed so that these are symmetrical with an origin in a complex plane. In cases where the calculation result u is equally divided into four pieces as in the above-described example, the disperser 15 uses, as the complex numbers defined for each first subdata, four complex numbers which illustrate directions from the origin on the complex plane, and which are different from each other but an absolute value of a real part thereof and an absolute value of an imaginary part thereof are the same, that is, four complex numbers which have the same absolute value and have an argument (90 k−45) degree with respect to k=1, 2, 3, and 4. This allows a reduction of the PAPR (Peak-to-Average Power Ratio) as described later.

A column vector m is prepared which is represented by following equation (4), the size thereof being N/4 and the value of each element thereof is 1.

[Eq. 4]
$$m = \begin{bmatrix} 1 \\ 1 \\ \vdots \\ 1 \end{bmatrix} \quad (4)$$

The post-dispersion first subdata $v_1$, $v_2$, $v_3$ and $v_4$ generated by adding the complex numbers defined for each above-described first subdata to the values of the elements of each first subdata are represented by following equation (5) using the predetermined real number t and the column vector m. Where, i is an imaginary unit. Parameter t is a value defined beforehand in consideration of PAPR and BER (Bit Error Rate) as described later. The disperser 15 sends the post-dispersion first subdata $v_1$, $v_2$, $v_3$ and $v_4$ to the sorter 16 and the operator 17.

[Eq. 5]
$$v_1 = u_1 + t(-m - im)$$
$$v_2 = u_2 + t(-m + im)$$
$$v_3 = u_3 + t(m - im)$$
$$v_4 = u_4 + t(m + im) \quad (5)$$

The sorter 16 generates second subdata which is generated by arranging each element of the post-dispersion first subdata in a position different from a position of the element in the post-dispersion first subdata and replacing a value of at least one element among the arranged elements with 0, the combinations of elements of the same line in the post-dispersion first subdata and the second subdata being different from each other. The reason for making the combinations of the elements of the same line in the post-dispersion first subdata and the second subdata being different from each other is to reconstruct the original input signal on the reception-side described later. For example, in cases where the second subdata is generated by transposing the first and the second elements among four elements of the post-dispersion first subdata, and transposing the third and the fourth elements thereof, the combination of the first element of post-dispersion first subdata and the first element of the second subdata is the same as the combination of the second element of the post-dispersion first subdata and the second element of the second subdata. Similarly, the combination of the third element of the post-dispersion first subdata and the third element of the second subdata is the same as the combination of the fourth element of the post-dispersion first subdata and the fourth element of second subdata. Therefore, the sorter 16 does not rearrange only some of the elements in the post-dispersion first subdata, but rearranges the elements so that entire elements are circulated. As an example, the sorter 16 may be configured so as to shift the elements of the post-dispersion first subdata toward a predetermined direction the predetermined number of times, and to replace the value of at least one element among them with 0.

Hereinafter, an example will be described in which the elements of the post-dispersion first subdata are shifted once upward, and a value of an element of the last line among the shifted data is replaced with 0 to generate the second subdata. That is, the sorter 16 shifts the elements of the post-dispersion first subdata so that the p-th element moves to the p−1th position (p is an integer of 2 or more) and the first element moves to the last position, and the sorter 16 replaces the value of the element shifted to the last position with 0. The second subdata $v'_1$ generated based on the post-dispersion first subdata $v_1$ represented by following equation (6) is represented as following equation (7).

[Eq. 6]
$$v_1 = \begin{bmatrix} v_0 \\ v_1 \\ \vdots \\ v_{\frac{N}{4}-2} \\ v_{\frac{N}{4}-1} \end{bmatrix} \quad (6)$$

-continued

[Eq. 7]

$$v'_1 = \begin{bmatrix} v_1 \\ v_2 \\ \vdots \\ v_{\frac{N}{4}-1} \\ 0 \end{bmatrix} \quad (7)$$

The sorter 16 generates second subdata based on other post-dispersion first subdata in the same way, and sends the second subdata to the operator 17. The operator 17 performs a calculation using the elements of the same line of the post-dispersion first subdata and the second subdata generated based on the post-dispersion first subdata to generate post-average first subdata. In cases where an element in the second subdata is not the element of which the value is replaced with 0 by the sorter 16, the operator 17 divides the value of the element of the post-dispersion first subdata in the same line as this element by an amplitude coefficient which is a predetermined real number, and divides a sum of the divided result and the value of the element of second subdata by 2. On the other hand, in cases where an element of the second subdata is the predetermined element of which the value is replaced with 0 by the sorter 16, the operator 17 divides the value of the element of the post-dispersion first subdata in the same line as this element by 2. The post-average first subdata is generated by applying such calculation for each of the elements of the second subdata.

That is, the post-average first subdata $w_1$ is represented by following equation (8), which is generated by applying the calculation to the post-dispersion first subdata $v_1$ represented by the above-described equation (6) using the second subdata $v'_1$ represented by above-described equation (7). Parameter "a" in the following equation (8) represents an amplitude coefficient. The amplitude coefficient a is a value defined beforehand in consideration of PAPR and BER as described later.

[Eq. 8]

$$w_1 = \begin{bmatrix} \frac{\frac{v_0}{a} + v_1}{2} \\ \frac{\frac{v_1}{a} + v_2}{2} \\ \vdots \\ \frac{\frac{v_{\frac{N}{4}-2}}{a} + v_{\frac{N}{4}-1}}{2} \\ \frac{v_{\frac{N}{4}-1}}{2} \end{bmatrix} \quad (8)$$

The operator 17 performs similar calculation for other post-dispersion first subdata using the second subdata. The operator 17 sends the post-average first subdata to the corrector 18.

The corrector 18 subtracts from values of respective elements of the post-average first subdata correction coefficients which are complex numbers defined for each first subdata, to generate post-correction first subdata. It may be configured to use values which are obtained by multiplying the dispersion coefficients by a predetermined real number, as the correction coefficients. If an absolute value of a real part and an absolute value of an imaginary part of each of the correction coefficients are expressed by c, the correction coefficient being calculated by multiplying the dispersion coefficient by the predetermined real number, the post-correction first subdata $x_1$, $x_2$, $x_3$, and $x_4$ are represented by following equation (9), which is generated by subtracting the correction coefficients from the post-average first subdata $w_1$, $w_2$, $w_3$, and $w_4$. Parameter "c" is a value defined beforehand in consideration of PAPR and BER as described later. The dispersion coefficients and the correction coefficients may be same values, that is, "t" in the above-described equation (5) and "c" in following equation (9) may have same values, and the dispersion coefficients and the correction coefficients may be different each other. That is, "t" and "c" may be different each other. The corrector 18 sends the post-correction first subdata $x_1$, $x_2$, $x_3$, and $x_4$ to the synthesizer 19.

[Eq. 9]

$$x_1 = w_1 - c(-m - im)$$

$$x_2 = w_2 - c(-m + im)$$

$$x_3 = w_3 - c(m - im)$$

$$x_4 = w_4 - c(m + im) \quad (9)$$

The synthesizer 19 generates a baseband signal based on the data x, as represented by following equation (10), the data x is synthesized in which the post-correction first subdata is arranged in the position of first subdata when dividing the calculation result by the divider 14. That is, the synthesizer 19 generates the synthesized data x by arranging the post-correction first subdata $x_1$, $x_2$, $x_3$, and $x_4$ in the order in the calculation result u of the original first subdata $u_1$, $u_2$, $u_3$, and $u_4$ from which post-correction first subdata is generated. The synthesizer 19 sends the baseband signal to the transmitter 20.

[Eq. 10]

$$x = \begin{bmatrix} x_1 \\ x_2 \\ x_3 \\ x_4 \end{bmatrix} \quad (10)$$

The transmitter 20 generates the transmission signal from the baseband signal, and transmits the transmission signal to another apparatus via the transmission/reception switch 50 and the antenna 10.

Figure 3B:
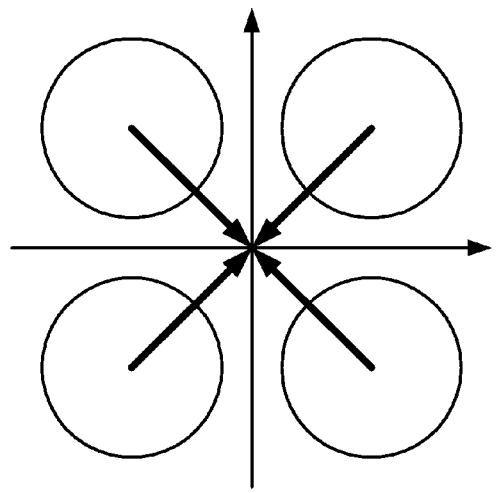
Figure 3C:
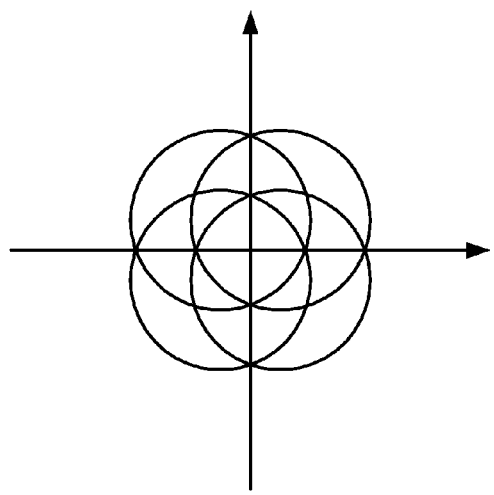

A principle of reduction of PAPR by above-described calculation will be described. FIGS. 3A to 3C are drawings illustrating the calculation processes which the communication apparatus according to the first embodiment performs. FIGS. 3A to 3C illustrate the complex number planes in which horizontal axes are real axes and vertical axes are imaginary axes. In FIG. 3A, a circle of which the center is an origin in the drawing illustrates a range in which points corresponding to respective elements of the calculation result u by the IFFT unit 13 are positioned on the complex plane. Four arrows in the drawing illustrate the complex numbers indicating the first subdata which is generated by equally dividing the calculation result u by the IFFT unit 13 into four by the divider 14. Points on the complex plane are positioned in each circle in FIG. 3B, the points on the complex plane corresponding to respective elements of the post-dispersion first subdata which is generated by adding the dispersion coefficients defined for each first subdata to the values of respective elements of first subdata in the disperser 15.

The operator 17 performs the above-described calculation using the post-dispersion first subdata and the second subdata generated from the post-dispersion first subdata. The point on the complex plane corresponding to each element of post-correction first subdata is positioned in a circle which is illustrated in FIG. 3A, the post-correction first subdata being generated, by the corrector 18, by subtracting from respective elements of a post-average first subdata the correction coefficients which are the same values as the dispersion coefficients illustrated by arrows in the drawing. Moreover, in cases where the dispersion coefficients are different from correction coefficients, the point on the complex plane corresponding to each element of post-correction first subdata is positioned in each of circles of which centers are different, as illustrated in FIG. 3C, for example.

Now, it is assumed that, for example, the above-described calculation is applied to the first subdata represented by following equation (11). For sake of simplicity, each element is a real number. The PAPR of the data generated from the following equation (11) is 3.2906 dB.

[Eq. 11]

$$\begin{bmatrix} -2 \\ -1 \\ 0 \\ 1 \end{bmatrix} \quad (11)$$

The post-dispersion first subdata is represented by following equation (12) if the dispersion coefficient=3.

[Eq. 12]

$$\begin{bmatrix} 1 \\ 2 \\ 3 \\ 4 \end{bmatrix} \quad (12)$$

The second subdata is represented by following equation (13), the second subdata being generated by shifting the elements of the post-dispersion first subdata represented by the above-described equation (12) one time upward by the sorter 16, and replacing the value of the last line with 0.

[Eq. 13]

$$\begin{bmatrix} 2 \\ 3 \\ 4 \\ 0 \end{bmatrix} \quad (13)$$

If the amplitude coefficient is 1 for sake of simplicity, the post-average first subdata is represented by following equation (14), the post-average first subdata being generated by applying the calculation by the operator 17 using the second subdata represented by the above-described equation (13). The PAPR of the data generated from following equation (14) is 2.9662 dB, thus it can be understood that the PAPR can be lowered by applying the above-described calculation.

[Eq. 14]

$$\begin{bmatrix} 1.5 \\ 2.5 \\ 3.5 \\ 2 \end{bmatrix} \quad (14)$$

FIG. 4 is a flowchart illustrating one example of operation of a transmission control performed by the communication apparatus according to the first embodiment. The modulator 11 modulates an input signal in a predetermined modulation scheme and generates a modulation signal, and the serial-parallel converter 12 performs serial-parallel conversion on the modulation signal, to generate a parallel signal, and assigns the generated parallel signal to subcarriers with frequency components orthogonal to each other to generate a subcarrier modulation signal (step S110). The IFFT unit 13 performs an IFFT on the subcarrier modulation signal (step S120).

The divider 14 divides the calculation result by the IFFT unit 13 into a predetermined number of pieces to generate a plurality pieces of first subdata (step S130). The disperser 15 adds the dispersion coefficients defined for each first subdata to values of respective elements of the first subdata (step S140). The sorter 16 replaces, with 0, for example, the value of the element of the last line in the post-dispersion first subdata of which elements are shifted once upward to generate a second subdata (step S150). The operator 17 performs a calculation which, for example, divides the value of the last line of the post-dispersion first subdata by 2, divides the values of other elements of the post-dispersion first subdata by the amplitude coefficient, adds the values of the elements of the second subdata to the result, and divides the result by 2 (step S160).

The corrector 18 subtracts the correction coefficients defined for each first subdata from values of respective elements of the post-average first subdata (step S170). The synthesizer 19 generates a baseband signal based on the synthesized data in which the post-correction first subdata is arranged in the position of first subdata at the time when the divider 14 has divided the calculation result (step S180). The transmitter 20 generates a transmission signal from the baseband signal, and transmits the transmission signal to another apparatus via the transmission/reception switch 50 and the antenna 10 (step S190). Completion of the transmission process in the step S190 will end the process.

The processing on the reception side will be described below. The receiver 49 receives the transmission signal via the antenna 10 and the transmission and reception switch 50, and generates a baseband signal. The receiver 49 sends the generated baseband signal to the reception-side divider 48. The reception-side divider 48 performs serial-parallel conversion on the baseband signal to generate a parallel signal. In the above-described example, the parallel signal corresponds to the data x represented by the above-described equation (10). The reception-side divider 48 divides the parallel signal into a predetermined number of pieces to generate subdata, and sends the subdata to the inverse corrector 47. The predetermined number is the same as the number used by the divider 14 on the transmission side, and the number of the elements included in each subdata is also the same as the number of the elements included in each first subdata generated on the transmission side. The communication apparatus on the reception-side may hold the information regarding the predetermined number used on the transmission side and the number of the elements included in each subdata, and may also hold information regarding the dispersion coefficients, the amplitude coefficient and the correction coefficients, which have been used on the transmission side.

Therefore, in cases where the divider 14 divides the calculation result by the IFFT unit 13 into the divisor of the FFT size, the reception-side divider 48 divides the parallel signal into the divisor of the number of the elements of the parallel signal, the divisor being the same values as the divisor of the FFT size. In the above-described example, the reception-side divider 48 divides the parallel signal x into four equally as above-described equation (10) to generate subdata, and sends the generated four pieces of subdata to the inverse corrector 47.

The inverse corrector 47 adds the correction coefficients which are complex numbers defined for each subdata to the values of respective elements of subdata, multiplies the result by 2, to generate the post-inverse-correction subdata. The correction coefficients are the same as the correction coefficients used by the corrector 18 on the transmission side. The post-inverse-correction subdata is represented by following equation (15), and each element of the post-inverse-correction subdata y1 is represented as following equation (16). The inverse corrector 47 sends the post-inverse-correction subdata to the inverse operator 46.

[Eq. 15]

$$y_1 = 2(x_1 + c(-m - im)) = 2w_1$$
$$y_2 = 2(x_2 + c(-m + im)) = 2w_2$$
$$y_3 = 2(x_3 + c(m - im)) = 2w_3$$
$$y_4 = 2(x_4 + c(m + im)) = 2w_4$$

(15)

[Eq. 16]

$$y_1 = \begin{bmatrix} \frac{v_0}{a} + v_1 \\ \frac{v_1}{a} + v_2 \\ \vdots \\ \frac{v_{\frac{N}{4}-2}}{a} + v_{\frac{N}{4}-1} \\ v_{\frac{N}{4}-1} \end{bmatrix}$$

(16)

The inverse operator 46 performs a calculation which subtracts from a value of a predetermined element of the post-inverse-correction subdata a value of an element associated with the predetermined element, and multiplies the amplitude coefficient which is a predetermined real number by the subtracted value. Subsequently, the inverse operator 46 repeats a calculation the predetermined number of times to generate post-inverse-operation subdata, the calculation subtracting the value of the element applied the above calculation from a value of an element associated with the element applied the above calculation and multiplying the subtracted value by the amplitude coefficient. The amplitude coefficient is the same as the amplitude coefficient used by the operator 17 on the transmission side. The predetermined number of times is obtained by subtracting one from the number of elements of the post-inverse-correction subdata. Moreover, a position from which the calculation starts in the elements of the post-inverse-correction subdata is determined based on the position of the element in the second subdata, the value of the element being replaced with 0 when generating the second subdata by the sorter 16 on the transmission side. The communication apparatus on the reception-side holds the information on the position of the element, the value of the element being replaced with 0 when generating the second subdata by the sorter 16 on the transmission side, and information representing correspondence relationship of the values of elements to be subtracted value and subtracting value among the elements of the post-inverse-correction subdata.

As above-described example, in cases where the second subdata is generated by shifting the elements of the post-dispersion first subdata once upward by the sorter 16 on the transmission side, and replacing the value of the element of the last line with 0, each element in the post-inverse-correction subdata is associated with an element located right after the each element. The inverse operator 46 subtracts, from a value of a predetermined element of the post-inverse-correction subdata, an element associated with the predetermined element, the element being the element of the last line in the post-inverse-correction subdata, or an element located right after the predetermined element and applied the calculation by the inverse operator 46, and the inverse operator 46 multiplies the result by the amplitude coefficient.

For example, with respect to the post-inverse-correction subdata represented by the above-described equation (16), the inverse operator 46 subtracts the value of the element of the last line from the value of the element of the second line from the bottom, and multiplies the result by the amplitude coefficient, to generate the post-inverse-operation subdata. Subsequently, the inverse operator 46 subtracts the value of the element of the second line from the bottom applied the above-described calculation from the value of the element of the third line from the bottom, and multiplies the result by the amplitude coefficient. Thus, by performing the calculations sequentially from the last line, the calculations multiplying the amplitude coefficient by the value in which the value of the p-th element is subtracted from the value of the p−1th element, the post-inverse-operation subdata $z_1$ represented by following equation (17) is obtained. The post-inverse-operation subdata $z_1$ corresponds to the post-dispersion first subdata $v_1$ generated by applying the calculation by the disperser 15 on the transmission side.

[Eq. 17]

$$z_1 = \begin{bmatrix} v_0 \\ v_1 \\ \vdots \\ v_{\frac{N}{4}-2} \\ v_{\frac{N}{4}-1} \end{bmatrix} = v_1$$

(17)

The inverse operator 46 similarly applies the calculation to other post-inverse-correction subdata, and sends the post-inverse-operation subdata $z_1$, $z_2$, $z_3$, and $z_4$ which correspond to the post-dispersion first subdata $v_1$, $v_2$, $v_3$, and $v_4$, respectively, to the inverse disperser 45.

The inverse disperser 45 subtracts the dispersion coefficients from values of respective elements of the post-inverse-operation subdata to generate post-inverse-dispersion subdata, the dispersion coefficients being complex numbers defined for each subdata, and at least one of the dispersion coefficients being a complex number other than 0. The dispersion coefficients are the same as the dispersion coefficients used by the disperser 15 on the transmission side. The post-inverse-dispersion subdata $r_1$, $r_2$, $r_3$, and $r_4$ which are generated by applying the calculation to the post-inverse-operation subdata $z_1$, $z_2$, $z_3$, and $z_4$ are represented by following equation (18). The inverse disperser 45 sends the post-inverse-dispersion subdata $r_1$, $r_2$, $r_3$, and $r_4$ to the reception-side synthesizer 44. Referring to the above-described equation (5), the post-inverse-dispersion subdata $r_1$, $r_2$, $r_3$, and $r_4$ correspond to the first subdata $u_1$, $u_2$, $u_3$, and $u_4$ generated by the divider 14. The inverse disperser 45 sends the post-inverse-dispersion subdata to the reception-side synthesizer 44.

[Eq. 18]

$$r_1 = z_1 - t(-m - im)$$

$$r_2 = z_2 - t(-m + im)$$

$$r_3 = z_3 - t(m - im)$$

$$r_4 = z_4 - t(m + im) \quad (18)$$

The reception-side synthesizer 44 sends the synthesized data r, in which the post-inverse-dispersion subdata are arranged in the position when dividing by the reception-side divider 48, to the FFT unit 43 as represented by following equation (19). The data r corresponds to the calculation result u by the IFFT unit 13 on the transmission side.

[Eq. 19]

$$r = \begin{bmatrix} r_1 \\ r_2 \\ r_3 \\ r_4 \end{bmatrix} \quad (19)$$

The FFT unit 43 performs an FFT on the calculation result r by the reception-side synthesizer 44, to generate a subcarrier modulation signal, and sends the generated subcarrier modulation signal to the parallel-serial converter 42. The parallel-serial converter 42 performs parallel-serial conversion on the subcarrier modulation signal to generate a serial signal. The parallel-serial converter 42 sends the generated serial signal to the demodulator 41. The demodulator 41 demodulates the serial signal in a predetermined demodulation scheme. For example, the demodulator 41 performs QPSK demodulation on the serial signal. Accordingly, the input signal modulated by the modulator 11 can be demodulated and output by the demodulator 41.

FIG. 5 is a flowchart illustrating one example of operation of a reception control performed by the communication apparatus according to the first embodiment. The receiver 49 receives the transmission signal via the antenna 10 and the transmission and reception switch 50, and generates the baseband signal (step S210). The reception-side divider 48 performs serial-parallel conversion on the baseband signal to generate the parallel signal (step S220). The reception-side divider 48 divides the parallel signal into a predetermined number of pieces to generate subdata (step S230). The inverse corrector 47 adds the correction coefficients defined for each subdata to the values of respective elements of subdata, and multiplies the result by 2, to generate the post-inverse-correction subdata (step S240).

The inverse operator 46 initializes p based on the number of the elements of subdata (step S250). With respect to a certain post-inverse-correction subdata, the inverse operator 46 subtracts the value of the element in p-th line thereof from the value of the element in p−1th line thereof, and multiplies the result by the amplitude coefficient (step S260). That is, the inverse operator 46 subtracts the value of the element in the last line from the value of the element in the second line from the bottom, and multiplies the result by the amplitude coefficient. The inverse operator 46 detects whether or not p is the predetermined minimum value, that is, p=2 (step S270), and discriminates whether or not the calculation has been completed, the calculation subtracting the value of the element in the second line from the value of the element in the first line, and multiplies the result by the amplitude coefficient. In cases where p is not 2 (step S270:N), the inverse operator 46 subtracts 1 from p (step S280). Then, the inverse operator 46 returns to the step S260, and repeats above-described processes.

In cases where p becomes 2 by repeating the above-described processes (step S270:Y), it is detected whether or not the above-described processes have been completed for all post-inverse-correction subdata (step S290). In cases where the above-described processes have not been completed for all post-inverse-correction subdata (step S290:N), the inverse operator 46 returns the process of the reception control to the step S250, and causes the above-described processes to be repeated. In cases where the above-described processes have been completed for all post-inverse-correction subdata (step S290:Y), the process of the reception control proceeds to step S300. The inverse operator 46 may be configured to perform the above-described processes to each post-inverse-correction subdata in parallel.

The inverse disperser 45 subtracts the dispersion coefficients defined for each subdata from the values of respective elements of the post-inverse-operation subdata to generate the post-inverse-dispersion subdata (step S300). The reception-side synthesizer 44 arranges the post-inverse-dispersion subdata in the position at the time of dividing and synthesizes them, and the FFT unit 43 performs an FFT on the synthesized data to generate the subcarrier modulation signal (step S310). The parallel-serial converter 42 performs parallel-serial conversion on the subcarrier modulation signal to generate the serial signal, and the demodulator 41 demodulates the serial signal in a predetermined demodulation scheme (step S320).

As explained above, according to the communication apparatus 1 of the first embodiment of the present invention, it is possible to reduce the PAPR in OFDM communication by applying the predetermined calculation to the calculation result obtained by performing an IFFT on the subcarrier modulation signal, and generating the baseband signal. Moreover, as described later, it is possible to reduce the PAPR and to control a degree of reduction in the PAPR and an error rate.

Second Embodiment

The structure of a communication apparatus 1 according to a second embodiment is the same as that in the first embodiment. A manner of generating the second subdata in the sorter 16, which is different from a manner in the first embodiment, will be described. The communication apparatus 1 according to the second embodiment selects elements of which values are to be 0 among elements of the post-dispersion first subdata shifted once upward by the sorter 16 at a predetermined interval of elements, and replaces the values of the selected elements with 0 to generate the second subdata.

The sorter 16, for example as represented by following equation (20), replaces with 0, the values of the elements in even lines in the post-dispersion first subdata in which elements are shifted once upward to generate the second subdata.

[Eq. 20]

$$v'_1 = \begin{bmatrix} v_1 \\ 0 \\ v_3 \\ 0 \\ \vdots \\ 0 \\ v_{\frac{N}{4}-1} \\ 0 \end{bmatrix} \quad (20)$$

The post-average first subdata $w_1$ is represented by a following equation (21), the post-average first subdata being generated by applying the calculation to the post-dispersion first subdata $v_1$ represented by the above-described equation (6) using the second subdata $v'_1$ represented by the above-described equation (20) in the operator 17.

[Eq. 21]

$$w_1 = \begin{bmatrix} \dfrac{\dfrac{v_0}{a}+v_1}{2} \\ \dfrac{v_1}{2} \\ \dfrac{\dfrac{v_2}{a}+v_3}{2} \\ \dfrac{v_3}{2} \\ \vdots \\ \dfrac{v_{\frac{N}{4}-3}}{2} \\ \dfrac{\dfrac{v_{\frac{N}{4}-2}}{a}+v_{\frac{N}{4}-1}}{2} \\ \dfrac{v_{\frac{N}{4}-1}}{2} \end{bmatrix} \quad (21)$$

In this case, the inverse operator 46 on the reception-side subtracts, from a value of an element in the odd line of the post-inverse-correction subdata, a value of an element in the even line located right after the element in the odd line, and multiplies the result by the amplitude coefficient. In this embodiment, it is only necessary to replace the processes of steps S250-S280 in FIG. 5 to a process by one step, in which the value of the element in the even line located right after the element in the odd line is subtracted from the value of the element of the odd line in the post-inverse-correction subdata and the subtracted value is multiplied by the amplitude coefficient.

Moreover, for example, the sorter 16 classifies the post-dispersion first subdata in which the elements are shifted once upward into a plurality of groups each including four elements, and replaces the value of the element in the last line of each group with 0, to generate the second subdata represented by following equation (22).

[Eq. 22]

$$v'_1 = \begin{bmatrix} v_1 \\ v_2 \\ v_3 \\ 0 \\ \vdots \\ v_{\frac{N}{4}-2} \\ v_{\frac{N}{4}-1} \\ 0 \end{bmatrix} \quad (22)$$

The post-average first subdata $w_1$ is represented by following equation (23), the post-average first subdata being generated by applying the calculation to the post-dispersion first subdata $v_1$ represented by the above-described equation (6) using the second subdata $v'_1$ represented by the above-described equation (22) in the operator 17.

[Eq. 23]

$$w_1 = \begin{bmatrix} \dfrac{\dfrac{v_0}{a}+v_1}{2} \\ \dfrac{\dfrac{v_1}{a}+v_2}{2} \\ \dfrac{\dfrac{v_2}{a}+v_3}{2} \\ \dfrac{v_3}{2} \\ \vdots \\ \dfrac{\dfrac{v_{\frac{N}{4}-3}}{a}+v_{\frac{N}{4}-2}}{2} \\ \dfrac{\dfrac{v_{\frac{N}{4}-2}}{a}+v_{\frac{N}{4}-1}}{2} \\ \dfrac{v_{\frac{N}{4}-1}}{2} \end{bmatrix} \quad (23)$$

In this case, the inverse operator 46 on the reception-side classifies the post-inverse-correction subdata into a plurality of groups each including four elements, performs a calculation which, subtracts, for each of the plurality of groups, a value of an element associated with a predetermined element from a value of the predetermined element, and multiplies the result by the amplitude coefficients. After that, the inverse operator 46 repeats a calculation twice which subtracts a value of an element applied in the above calculation from a value of an element associated with the element applied in the above calculation, and multiplies the result by the amplitude coefficient. That is, the inverse operator 46 subtracts the value of the element in the last line in each group from the value of the element in the second line from the bottom in each group, and multiplies the result by the amplitude coefficient. Then, the inverse operator 46 subtracts the value of the element in the second line from the bottom in each group applied the above-described calculation from the value of the element of the third line from the bottom in each group, and then multiplies the result by the amplitude coefficient. The inverse operator 46 repeats similar calculations in order until the value of the element in the first line in the group is subjected to the calculation.

In the step S250 of FIG. 5, the inverse operator 46 initializes p based on 4 which is the number of the elements included in one group. In the step S260, the inverse operator 46 subtracts the values of the elements in lines of natural number multiples of p from the values of the elements located in lines right before the elements in lines of natural number multiples of p respectively, and multiplies the result by the amplitude coefficient. For example, if the number of the elements of subdata is 8, the inverse operator 46 subtracts the value of the element in the fourth line from the value of the element in the third line and multiplies the result by the amplitude coefficient, and subtracts the value of the element in the eighth line from the value of the element in the seventh line and multiplies the result by the amplitude coefficient.

It is not limited to the above-described manner, but the sorter 16 can set the values of elements to 0 for every predetermined number of elements in the post-dispersion first subdata to generate the second subdata. In this case, since there are elements which serve as a basis for every predetermined number of elements on the reception-side, a process in the inverse operator 46 is accelerable.

As explained above, according to the communication apparatus 1 of the second embodiment of the present invention, it is possible to accelerate a reconstruction process on the reception-side in OFDM communication, in comparison with the communication apparatus 1 of the first embodiment.

Specific Examples

Figure 6A:
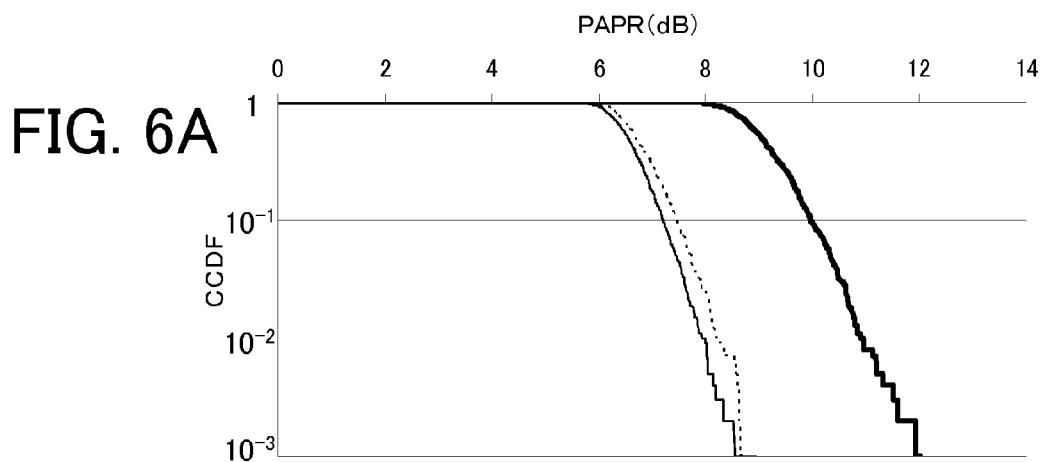
FIGS. 6A to 6C are diagrams illustrating simulated CCDF characteristics of PAPR of a baseband signal.
Figure 6B:
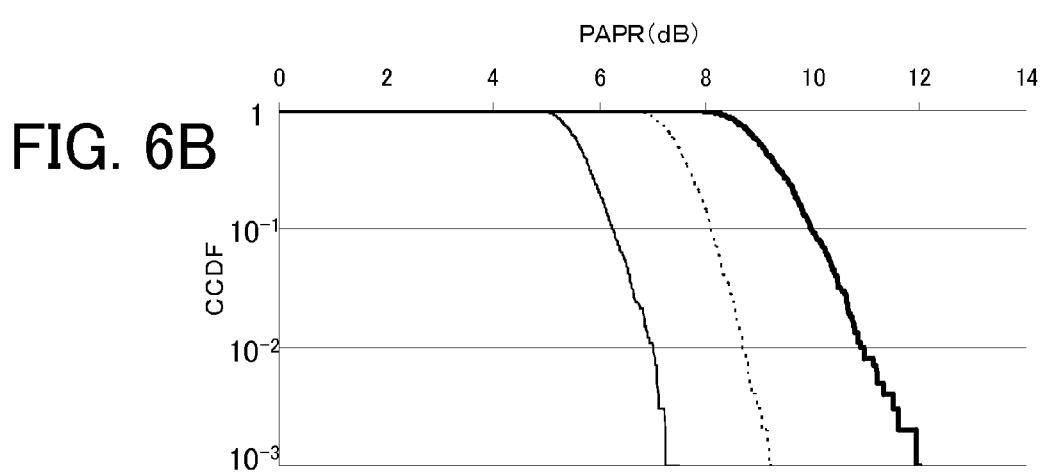
Figure 6C:
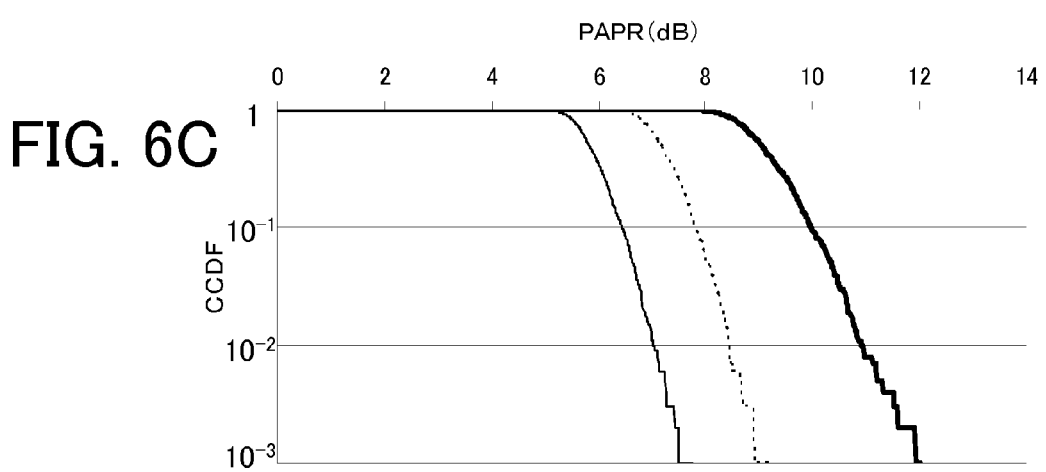

Next, the advantages of the embodiment of the invention will be described based on the results of simulation. Assuming that the predetermined modulation scheme is QPSK, and the FFT size is 2048, CCDF (Complementary Cumulative Dispersion Function) of the PAPR, that is, the characteristics of the probability of occurrence of PAPR, were compared. FIGS. 6A to 6C are diagrams illustrating simulated CCDF characteristics of the PAPR of the baseband signal. The abscissa represents the PAPR (unit: dB), and the ordinate represents the CCDF of the PAPR in each diagram. In each drawing, a thick solid-line graph represents the CCDF characteristic of the PAPR according to the related art, a thin solid-line graph represents the CCDF characteristic of the PAPR according to the first embodiment of the invention, and a dotted-line graph represents the CCDF characteristic of the PAPR according to the second embodiment of the invention.

For the first embodiment, the first subdata is generated by dividing equally the calculation result of the IFFT unit 13 into four pieces as above-described example, and above-described calculation is applied to each first subdata. For the second embodiment, the first subdata is generated by dividing equally the calculation result of the IFFT unit 13 into four pieces as above-described example, and above-described calculation is applied to the post-dispersion first subdata based on the second subdata generated by replacing the values of the elements in even lines in the post-dispersion first subdata of which elements are shifted once upward with 0. FIG. 6A illustrates the CCDF characteristic of the PAPR in cases of $t=0.06$ in the above-described equation (5), $a=0.5$ in the above-described equations (8) and (21), $c=0.06$ in the above-described equation (9). FIG. 6B illustrates the CCDF characteristic in case of $t=0.06$, $a=0.5$, and $c=0.05$, and FIG. 6C illustrates the CCDF characteristic in case of $t=0.06$, $a=0.4$, and $c=0.06$.

In both cases, within the illustrated range, the PAPR according to the first and second embodiments of the invention was reduced as compared with the PAPR according to the related art, and the PAPR according to the second embodiment was reduced more than that according to the first embodiment. In the first embodiment, it can be understood that the PAPR is reduced more in FIG. 6B in which the values t and c are different in comparison with FIG. 6A and FIG. 6C in which values t and c are same. Besides, although not illustrated, the CCDF characteristic of the PAPR if c and t are set to 0 was not mostly different from the related art. Therefore, in cases where c and t are 0, it can be understood that the PAPR is hardly reduced.

Figure 7A:
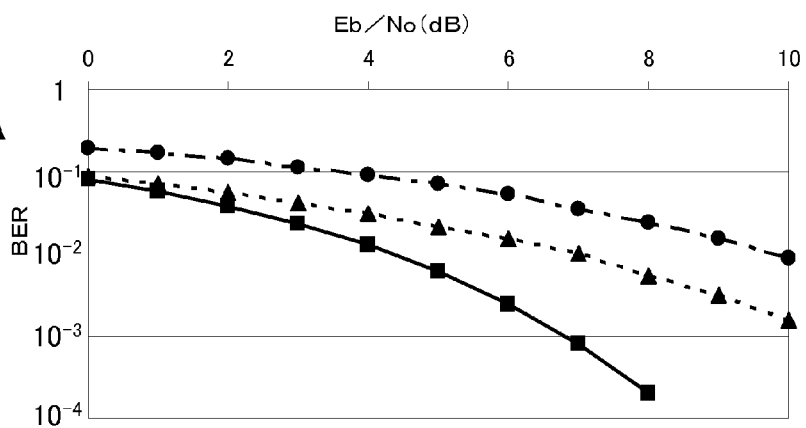
FIGS. 7A to 7C are diagrams showing simulated BER characteristics.
Figure 7B:
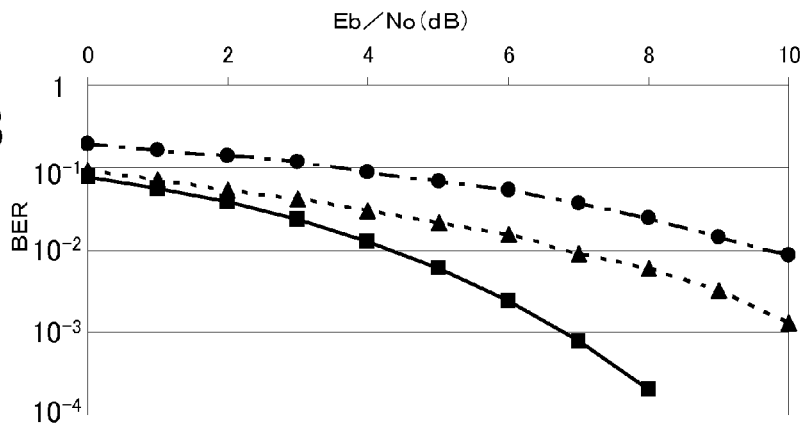
Figure 7C:
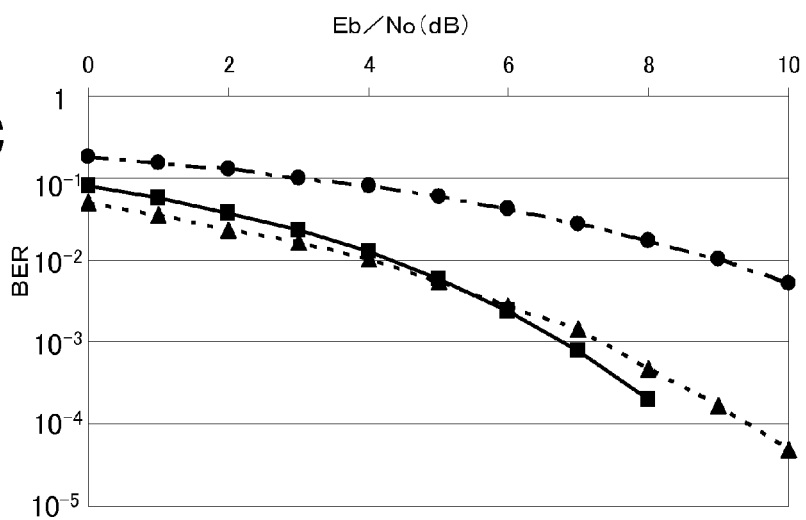

The simulation for the BER is performed similarly. FIGS. 7A to 7C are diagrams showing simulated BER characteristics. The abscissa represents the Eb/No (Energy per Bit to NOise power spectral density ratio), and the ordinate represents the BER in each diagram. The unit of Eb/No is dB. In each diagram, a solid-line showing the plot points by squares represents the BER according to the related art of the invention, a dotted-line showing the plot points by triangles represents the BER according to the first embodiment of the invention, and a dashed-line showing the plot points by circles represents the BER according to the second embodiment of the invention. FIG. 7A illustrates the BER characteristic in case of $t=0.06$, $a=0.5$, and $c=0.06$. FIG. 7B illustrates the BER characteristic in case of $t=0.06$, $a=0.5$, and $c=0.05$ and FIG. 7C illustrates the BER characteristic in case of $t=0.06$, $a=0.4$, and $c=0.06$.

The BER of the first embodiment of the invention in FIG. 7C is of the same degree as the related art, whereas the BER in other cases has degraded in comparison with the related art. Thus, in the first embodiment, the BER may change a lot due to the value of the amplitude coefficient.

Figure 8A:
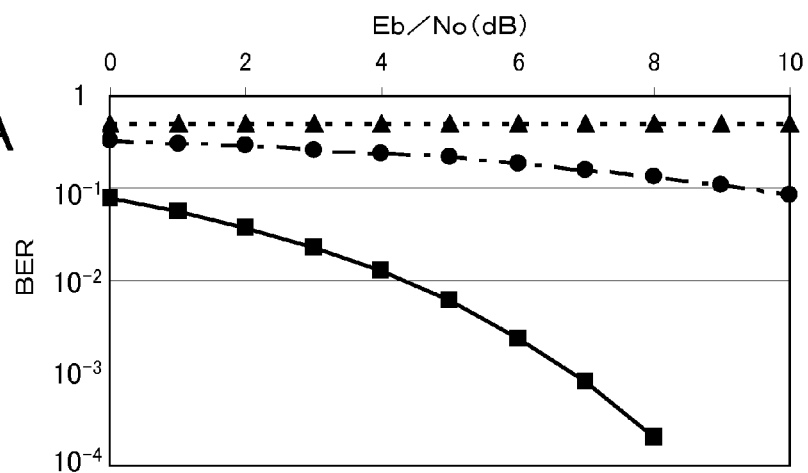
FIGS. 8A to 8C are diagrams showing a relationship between simulated BER and an amplitude coefficient.
Figure 8B:
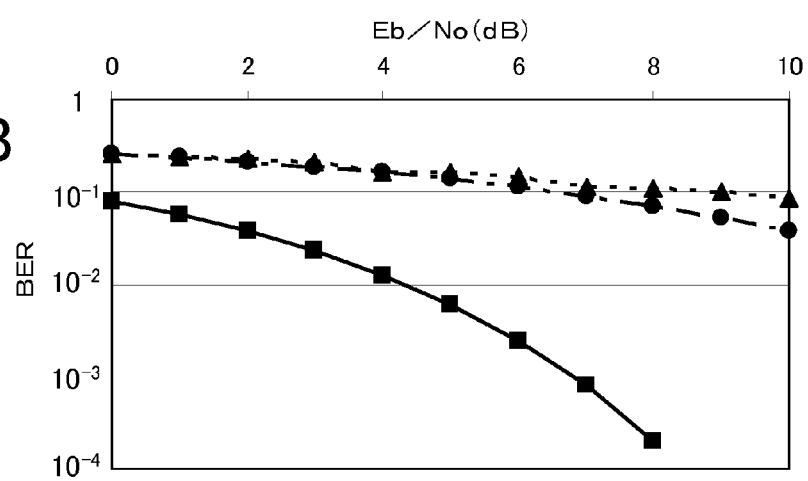
Figure 8C:
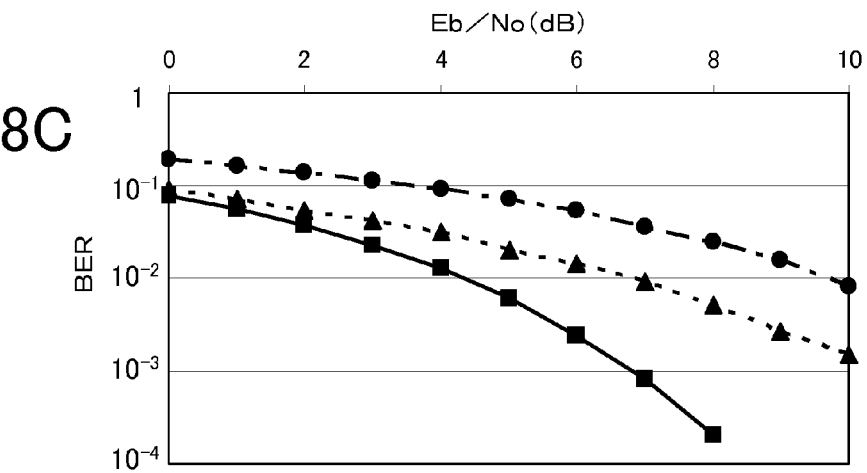

The simulation about the BER with other conditions was performed in which t and c were constant values, and the value a was changed. FIGS. 8A to 8C are diagrams showing a relationship between simulated BER and the amplitude coefficient. The illustration manner is similar to FIGS. 7A to 7C. FIG. 8A illustrates the BER characteristic in case of $t=0$, $a=1.5$, and $c=0$, FIG. 8B illustrates the BER characteristic in case of $t=0$, $a=1$, and $c=0$, and FIG. 8C illustrates the BER characteristic in case of $t=0$, $a=0.5$, and $c=0$. A small value is buried in noise when the amplitude coefficient a is made into one or more values, therefore the BER has degraded in FIG. 8A and FIG. 8B. However, the BER can be improved by increasing the transmission power. Moreover, it can be understood that making the value a less than 1 prevents the degradation of BER.

From above-described simulation, it is understood that the PAPR can be reduced by applying the predetermined calculation to the first subdata which is generated by dividing the data of a subcarrier modulation signal after an IFFT into the predetermined number of pieces, and by generating a baseband signal. Moreover, it is understood that it is possible to control the degree of reduction in the PAPR and BER by changing the dispersion coefficients, the amplitude coefficient, and the correction coefficients.

The modes of the invention are not limited to the foregoing embodiments. The modulation scheme of the modulator 11 is not limited to QPSK, but PSK (Phase Shift Keying), QAM (Quadrature Amplitude Modulation) or the like may be used instead of QPSK. The layout order of the modulator 11 and the serial-parallel converter 12 may be changed so that the serial-parallel converter 12 performs serial-parallel conversion on an input signal and assigns individual pieces of data in the parallel signal to subcarrier signals, and then the modulator 11 modulates the individual pieces of data in the parallel signal by a predetermined modulation scheme. In this case, the demodulation process is carried out on the reception side with the layout order of the demodulator 41 and the parallel-serial converter 42 being changed.

The IFFT unit 13 may be configured to perform an IDFT instead of an IFFT. The FFT unit 43 may be configured to perform a DFT instead of an FFT.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A communication apparatus for communicating with another apparatus in orthogonal frequency-division multiplexing wireless communication, the communication apparatus comprising:
   a modulator that modulates an input signal using a predetermined modulation scheme, and assigns the modulated input signal to subcarriers with frequency components orthogonal to each other, thereby generating a subcarrier modulation signal;
   a first transformer that performs an inverse fast Fourier transformation on the subcarrier modulation signal;
   a divider that divides a calculation result by the first transformer into a predetermined number of pieces to generate a plurality pieces of first subdata;
   a disperser that adds dispersion coefficients, which are complex numbers defined for each first subdata and of which at least one is a complex number other than 0, to values of respective elements of the plurality pieces of first subdata to generate post-dispersion first subdata;
   a sorter that generates second subdata in which each element of the post-dispersion first subdata is arranged in a position different from a position of the each element in the post-dispersion first subdata, and a value of at least one predetermined element is replaced with 0, and in which combinations of elements in same positions in the post-dispersion first subdata and in the second subdata are different from each other;
   an operator that divides a value of sum by 2, the value of sum being a sum of a value of an element which is not the predetermined element of which the value is replaced with 0 by the sorter among elements of the second subdata, and a value which is obtained by dividing a value of an element located in a same position in the post-dispersion first subdata as the position of the element which is not the predetermined element by a predetermined amplitude coefficient, and divides a value of an element by 2 in a same position in the post-dispersion first subdata as the position of the predetermined element among the elements of the second subdata, thereby generating post-average first subdata;
   a corrector that subtracts correction coefficients which are complex numbers defined for each first subdata from values of respective elements of the post-average first subdata to generate post-correction first data;
   a synthesizer that generates a baseband signal based on synthesized data in which the post-correction first subdata is arranged in positions of the plurality pieces of first subdata when the divider divides the calculation result; and
   a transmitter that generates a transmission signal from the baseband signal and transmits the transmission signal.

2. The communication apparatus according to claim 1, wherein,
   the divider equally divides the calculation result by the first transformer with a divisor of a fast Fourier transformation size.

3. The communication apparatus according to claim 2, wherein,
   the divider equally divides the calculation result by the first transformer into four pieces,
   the disperser uses complex numbers different from each other, which represent directions from an origin of a complex plane on the complex plane and in each of which an absolute value of a real part and an absolute value of an imaginary part are same, as the dispersion coefficients, and
   the corrector uses values which are obtained by multiplying a predetermined real number to the dispersion coefficients as the correction coefficients.

4. The communication apparatus according to claim 1, wherein,
   the sorter generates the second subdata by replacing at least one value of an element with 0, among data in which elements of the post-dispersion first subdata are shifted a predetermined number of times in a predetermined direction.

5. The communication apparatus according to claim 4, wherein,
   the sorter generates the second subdata by replacing a value of an element of a last line with 0, among data in which elements of the post-dispersion first subdata are shifted one time upward.

6. The communication apparatus according to claim 4, wherein,
   the sorter generates the second subdata by replacing values of elements of even lines with 0, among data in which elements of the post-dispersion first subdata are shifted one time upward.

7. The communication apparatus of claim 1 further comprising:
   a receiver that receives a transmission signal and generates a baseband signal;
   a serial-parallel converter that performs serial-parallel conversion on the baseband signal to generate a parallel signal;
   a reception-side divider that divides the parallel signal into a predetermined number of pieces to generate a plurality pieces of subdata;
   an inverse corrector that adds correction coefficients which are complex numbers defined for each subdata to values of respective elements of the plurality pieces of subdata, and multiplies the result by 2 to generate post-inverse-correction subdata;
   an inverse operator that subtracts from a value of a predetermined element of the post-inverse-correction subdata a value of an element associated with the predetermined element and multiplies the result by a predetermined amplitude coefficient, and after that, repeats a calculation a predetermined number of times, in which a value of an element applied the calculation is subtracted from a value of an element associated with the element applied the calculation and the result is multiplied by the amplitude coefficient, thereby generating post-inverse-operation subdata;
   an inverse disperser that subtracts dispersion coefficients, which are complex numbers defined for each subdata and of which at least one is a complex number other than 0, from values of respective elements of the post-inverse-operation subdata to generate post-inverse-dispersion subdata;

a reception-side synthesizer that synthesizes data in which the post-inverse-dispersion subdata is arranged in positions of the plurality pieces of subdata when the reception-side divider divides the parallel signal;

a second transformer that performs a fast Fourier transformation on the calculation result by the reception-side synthesizer to generate a subcarrier modulation signal; and a demodulator that demodulates the subcarrier modulation signal by a predetermined demodulation scheme.

8. The communication apparatus according to claim 7, wherein,
the reception-side divider equally divides the parallel signal with a divisor of a number of elements of the parallel signal.

9. The communication apparatus according to claim 8, wherein,
the reception-side divider equally divides the parallel signal into four pieces,
the inverse disperser uses complex numbers different from each other, which represent directions from an origin of a complex plane on the complex plane and in each of which an absolute value of a real part and an absolute value of an imaginary part are same, as the dispersion coefficients, and
the inverse corrector uses values which are obtained by multiplying a predetermined real number to the dispersion coefficients as the correction coefficients.

10. The communication apparatus according to claim 7, wherein,
the inverse operator subtracts from a value of a predetermined element of the post-inverse-correction subdata a value of an element associated with the predetermined element, the element associated with the predetermined element being an element located in a last line of the post-inverse-correction subdata, or an element located right after the predetermined element and applied the calculation by the inverse operator, and multiplies the result by the amplitude coefficient.

11. The communication apparatus according to claim 7, wherein,
the inverse operator subtracts from a value of an element of each odd line of the post-inverse-correction subdata a value of an element of an even line located right after the element of the each odd line, and multiplies the result by the amplitude coefficients.

12. A communication method that is executed by a communication apparatus communicating with another apparatus in orthogonal frequency-division multiplexing wireless communication, the communication method comprising:
a modulation step of modulating an input signal using a predetermined modulation scheme, and assigning the modulated input signal to subcarriers with frequency components orthogonal to each other, thereby generating a subcarrier modulation signal;
a first transformation step of performing an inverse fast Fourier transformation on the subcarrier modulation signal;
a dividing step of dividing a calculation result by the first transformation step into a predetermined number of pieces to generate a plurality pieces of first subdata;
a dispersion step of adding dispersion coefficients, which are complex numbers defined for each first subdata and of which at least one is a complex number other than 0, to values of respective elements of the plurality pieces of first subdata to generate post-dispersion first subdata;

a sort step of generating second subdata in which each element of the post-dispersion first subdata is arranged in a position different from a position of the each element in the post-dispersion first subdata, and a value of at least one predetermined element is replaced with 0, and in which combinations of elements in same positions in the post-dispersion first subdata and in the second subdata are different from each other;

an operation step of dividing a value of sum by 2, the value of sum being a sum of a value of an element which is not the predetermined element of which the value is replaced with 0 by the sort step among elements of the second subdata, and a value which is obtained by dividing a value of an element located in a same position in the post-dispersion first subdata as the position of the element which is not the predetermined element by a predetermined amplitude coefficient, and divides a value of an element by 2 in a same position in the post-dispersion first subdata as the position of the predetermined element among the elements of the second subdata, thereby generating post-average first subdata;

a correction step of subtracting correction coefficients which are complex numbers defined for each first subdata from values of respective elements of the post-average first subdata to generate post-correction first data;

a synthesis step of generating a baseband signal based on synthesized data in which the post-correction first subdata is arranged in positions of the plurality pieces of first subdata when dividing the calculation result in the dividing step; and a transmission step of generating a transmission signal from the baseband signal and transmits the transmission signal.

13. The communication method of claim 12 further comprising:
a receiving step of receiving a transmission signal and generating a baseband signal;
a serial-parallel conversion step of performing serial-parallel conversion on the baseband signal to generate a parallel signal;
a reception-side dividing step of dividing the parallel signal into a predetermined number of pieces to generate a plurality pieces of subdata;
an inverse correction step of adding correction coefficients which are complex numbers defined for each subdata to values of respective elements of the plurality pieces of subdata, and multiplying the result by 2 to generate post-inverse-correction subdata;
an inverse operation step of subtracting from a value of a predetermined element of the post-inverse-correction subdata a value of an element associated with the predetermined element and multiplying the result by a predetermined amplitude coefficient, and after that, repeating a calculation a predetermined number of times, in which a value of an element applied the calculation is subtracted from a value of an element associated with the element applied the calculation and the result is multiplied by the amplitude coefficient, thereby generating post-inverse-operation subdata;
an inverse dispersion step of subtracting dispersion coefficients, which are complex numbers defined for each subdata and of which at least one is a complex number other than 0, from values of respective elements of the post-inverse-operation subdata to generate post-inverse-dispersion subdata;

a reception-side synthesis step of synthesizing data in which the post-inverse-dispersion subdata is arranged in positions of the plurality pieces of subdata when the parallel signal is divided in the reception-side dividing step;
a second transformation step of performing a fast Fourier transformation on the calculation result in the reception-side synthesis step to generate a subcarrier modulation signal; and
a demodulation step of demodulating the subcarrier modulation signal by a predetermined demodulation scheme.

* * * * *